(12) United States Patent
Peters

(10) Patent No.: US 8,099,419 B2
(45) Date of Patent: Jan. 17, 2012

(54) INFERRING RULES TO CLASSIFY OBJECTS IN A FILE MANAGEMENT SYSTEM

(75) Inventor: Johan Christiaan Peters, Sankt Leon (DE)

(73) Assignee: SAP AG, Walldorf (DE)

( * ) Notice: Subject to any disclaimer, the term of this patent is extended or adjusted under 35 U.S.C. 154(b) by 439 days.

(21) Appl. No.: 12/339,070

(22) Filed: Dec. 19, 2008

(65) Prior Publication Data
US 2010/0161621 A1 Jun. 24, 2010

(51) Int. Cl.
*G06F 7/00* (2006.01)
(52) U.S. Cl. ......................................... 707/749
(58) Field of Classification Search ................. None
See application file for complete search history.

(56) References Cited

U.S. PATENT DOCUMENTS

| | | | |
|---|---|---|---|
| 6,606,620 B1 | | 8/2003 | Sundaresan et al. |
| 7,194,471 B1 * | | 3/2007 | Nagatsuka et al. ............ 1/1 |
| 2003/0135818 A1 * | | 7/2003 | Goodwin et al. ............ 715/500 |
| 2004/0015586 A1 * | | 1/2004 | Hegli et al. ............ 709/225 |
| 2004/0039786 A1 | | 2/2004 | Horvitz et al. |
| 2004/0059740 A1 * | | 3/2004 | Hanakawa et al. ............ 707/100 |
| 2009/0063470 A1 * | | 3/2009 | Peled et al. ............ 707/5 |
| 2010/0299290 A1 * | | 11/2010 | Chowdhury et al. ............ 706/12 |
| 2010/0312766 A1 * | | 12/2010 | Horn ............ 707/737 |

FOREIGN PATENT DOCUMENTS
EP 1852789 A1 7/2007
* cited by examiner

*Primary Examiner* — Apu Mofiz
*Assistant Examiner* — Thu Nga Nguyen

(57) ABSTRACT

Described are methods and systems related to inferring rules to classify an object to one of one or more target folders. One or more properties of the object to be classified are determined. A first degree of affinity between the object to be classified and the objects of the target folders, having a property identical to the object to be classified, is computed. A second degree of affinity between the object to be classified and the objects within each target folder, having a property identical to the object to be classified, is computed. A total degree of affinity between the object to be classified and each target folder is calculated. A normalized total degree of affinity is calculated by averaging the total degree of affinity across all target folders. The object is moved to a target folder having a highest value of the normalized total degree of affinity.

20 Claims, 5 Drawing Sheets

| | COMPANY | ADDRESS | CITY | CONTACT | PRODUCT |
|---|---|---|---|---|---|
| FOLDER 4 | RADIANCE SWITCHES | 4 MUSEUM ROAD | AMSTERDAM | J JANSEN | HEATERS |
| | RADIANCE SWITCHES | 4 MUSEUM ROAD | AMSTERDAM | W PIETERS | VALVES |
| FOLDER 3 | RADIANCE SWITCHES | 1 CHURCH STREET | FRANKFURT | SABINE WEISS | HEATERS |
| | | | | | |
| FOLDER 2 | AKRON HEATING | GREENLEIGH | CHICAGO | FRANK WANG | RADIATORS |
| | AKRON HEATING | GREENLEIGH | CHICAGO | FRANK WANG | HEATERS |
| FOLDER 1 | AKRON HEATING | 1 AKRON AVENUE | AKRON | SUZY STEEL | VALVES |
| | AKRON HEATING | 110 MILLER ROAD | AKRON | SUZY STEEL | VALVES |
| SOURCE FOLDER | AKRON HEATING | 1 AKRON AVENUE | AKRON | JOHN PETERS | PIPINGS |
| | | | | | |

FIG. 5

INFERRING RULES TO CLASSIFY OBJECTS IN A FILE MANAGEMENT SYSTEM

FIELD OF THE INVENTION

Embodiments of the invention generally relate to the field of automated object organization based on rules, and more particularly relates to methods and systems to infer rules to classify an object for filing.

BACKGROUND OF THE INVENTION

File folders generally include various types of objects that are selected to be stored in the folders based on a number of different characteristics. Manually sorting, classifying and storing such objects in the respective folders can be laborious and time consuming. Manually classifying objects may involve searching for objects already existing in each of the folders, and moving the unsorted object to a relevant folder based on some similarity between what already exists in the folder and the current object to be classified. When manual sorting actions are performed, each of the folders has to be navigated to and their content analyzed separately. Once the folders are analyzed, a decision will need to be taken on the folder to which the unsorted object is to be moved. A lot of time consuming navigation between multiple folders may also be involved while analyzing folders that are alike. The user may be confused when a large number of folders contain similar information. Thus, there is a need for an improved method and system to move the unsorted object based on a set of rules, and to infer the rules for future use.

SUMMARY OF THE INVENTION

Described are methods and systems related to inferring rules to classify an object to one of one or more target folders. The target folders may include one or more objects and corresponding one or more properties describing the object. One or more properties of the object to be classified are determined. A first degree of affinity between the object to be classified and the objects of the target folders, having a property identical to the object to be classified, is computed. The first degree of affinity is an exemplary composite indicator of the affinity of object's properties to a particular target folder and also the uniqueness of that affinity across all target folders. A second degree of affinity between the object to be classified and the objects within each target folder, having a property identical to the object to be classified, is computed. The second degree of affinity is an exemplary composite indicator of the statistical significance of the affinity of an object's properties to a particular target folder in light of all objects in a target folder. A total degree of affinity between the object to be classified and each target folder is calculated. A normalized total degree of affinity is calculated by averaging the total degree of affinity across all target folders. The object is moved to a target folder having a highest value of the normalized total degree of affinity.

These and other benefits and features of embodiments of the invention will be apparent upon consideration of the following description of embodiments thereof, presented in connection with the following drawings in which like reference numerals are used to identify like elements throughout.

BRIEF DESCRIPTION OF THE DRAWINGS

The claims set forth the embodiments of the invention with particularity. The embodiments of the invention, together with its advantages, may be best understood from the following detailed description taken in conjunction with the accompanying drawings. The invention is illustrated by way of example and not by way of limitation in the figures of the accompanying drawings. It should be noted that references to "an" or "one" embodiment in this disclosure are not necessarily to the same embodiment, and such references mean at least one.

FIG. 5 is an example screen display for inferring rules to classify an object to one of one or more target folders according to an embodiment of the invention.

DETAILED DESCRIPTION

Folders are digital containers generally used to store, manage and organize data objects. These folders may be divided further into subfolders. The folders and sub-folders may also be called directories and subdirectories. Regardless, the folders and sub-folders are typically arranged according to some logic in a tree structure format, for instance. An object is a collection of data stored in one unit or one file, such as programs, scripts, libraries, documents and the like. Each object has one or more properties associated with the object that describes the corresponding object. The property of the object may include description of the type of object, extension of the object, components of the object, title, author of the object and the like. The objects may also include additional information that enhances the meaning of the object or helps in recognition of the object. The objects may also include metadata of the additional information or the property of the object.

When an object has to be classified to a target folder, the likelihood of classifying the object to a target folder is determined based upon an affinity between the properties of the object to be classified and the properties associated with the objects that already exist in each target folder. In one embodiment, the object to be classified may not yet be assigned to any target folder but in another embodiment it may currently be residing in a source target folder and a re-classification process would move it to another target folder. The source target folder may include more than one object that has to be classified and moved to a target folder. The objects are classified to the target folder based on certain rules.

Figure 1:
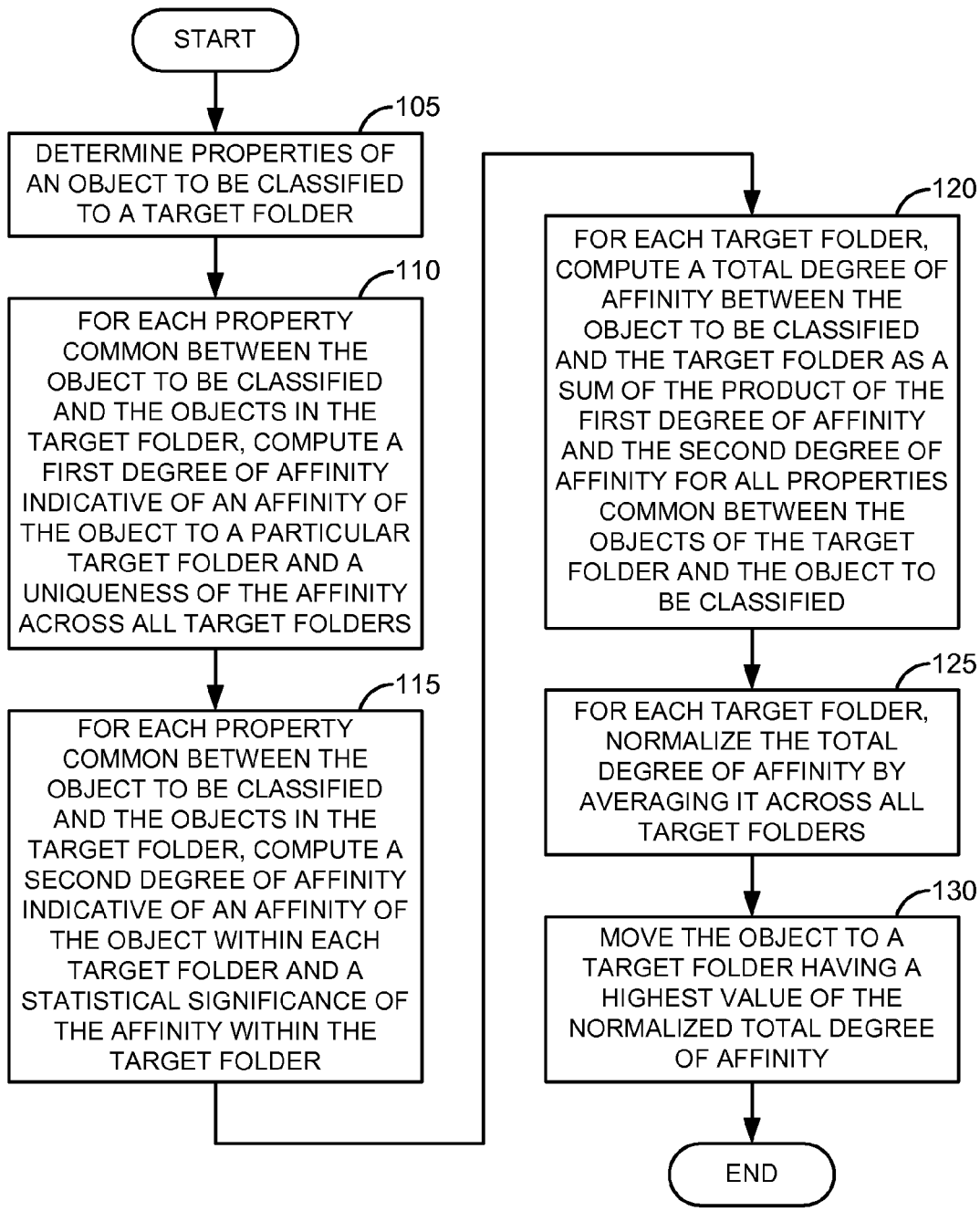
FIG. 1 is a flow diagram of an exemplary process for inferring rules to classify an object to one of one or more target folders, according to an embodiment of the invention.

FIG. 1 is a flow diagram of an exemplary process for inferring rules to classify an object to one of one or more target folders, according to an embodiment of the invention. In process block 105, properties of the object to be classified to a target folder are determined. In process block 110, a first degree of affinity for each property common between the object to be classified and the objects in the potential target folders is computed. Computing the first degree of affinity includes: selecting a property of the object to be classified, determining the number of objects having a property identical or nearly identical to the selected property of the object to be classified, in each target folder, determining total number of such objects across all target folders and calculating the ratio between the two numbers. Thus, the ratio between per target folder occurrence of each selected property of the object to be classified and the total number of occurrences of such property across all the target folders renders the first degree of affinity of the object to that target folder. The first degree of affinity is thus an exemplary composite indicator of not only the affinity of object's properties to a particular target folder but also the uniqueness of that affinity across all target folders.

In process block 115, a second degree of affinity for each property common between the object to be classified and the objects in the potential target folder is computed. Computing the second degree of affinity includes: selecting a property of the object to be classified, determining the number of objects having a property identical or nearly identical to the selected property of the object to be classified, in each target folder, determining a total number of all objects in the corresponding target folder and calculating a ratio between these two numbers. Thus, the ratio between the per target folder occurrence of each selected property of the object to be classified and the total number of all objects in the corresponding target folder renders the second degree of affinity of the object to that target folder. The second degree of affinity is thus an exemplary composite indicator of the statistical significance of the affinity of an object's properties to a particular target folder in light of all objects in a target folder.

The following table, Table 1, illustrates an exemplary application of the two degrees of affinity for classifying objects to determine which target folders they belong to in a file system. According to one embodiment, the two degrees of affinity are calculated for each property in common between the object to be classified and the objects of a target folder. Based on some function $f(A1, A2)$ of the two degrees of affinity, the object to be moved will be classified as belonging to one of the target folders. The exemplary table follows.

TABLE 1

|    | p1 | p2 | p3 | p4 | p5 |
|----|----|----|----|----|----|
| f1 | $f(A1_{p1/1}, A2_{p1/1})$ | $f(A1_{p2/1}, A2_{p2/1})$ | $f(A1_{p3/1}, A2_{p3/1})$ | $f(A1_{p4/1}, A2_{p4/1})$ | $f(A1_{p5/1}, A2_{p5/1})$ |
| f2 | $f(A1_{p1/2}, A2_{p1/2})$ | $f(A1_{p2/2}, A2_{p2/2})$ | $f(A1_{p3/2}, A2_{p3/2})$ | $f(A1_{p4/2}, A2_{p4/2})$ | $f(A1_{p5/2}, A2_{p5/2})$ |
| f3 | $f(A1_{p1/3}, A2_{p1/3})$ | $f(A1_{p2/3}, A2_{p2/3})$ | $f(A1_{p3/3}, A2_{p3/3})$ | $f(A1_{p4/3}, A2_{p4/3})$ | $f(A1_{p5/3}, A2_{p5/3})$ |
| f4 | $f(A1_{p1/4}, A2_{p1/4})$ | $f(A1_{p2/4}, A2_{p2/4})$ | $f(A1_{p3/4}, A2_{p3/4})$ | $f(A1_{p4/4}, A2_{p4/4})$ | $f(A1_{p5/4}, A2_{p5/4})$ |

For instance, in process block 120, a total degree of affinity between the object to be classified and the target folder is computed as a sum of a product of the first degree of affinity and the second degree of affinity for all properties common between the objects of a target folder and the object to be classified. This is repeated for all target folders, and in process block 125, the total degree of affinity is normalized across all target folders by calculating an average of the total degree of affinity for each target folder. The target folder with the highest value of the normalized total degree of affinity between each target folder is determined, and in process block 130, the object is moved to the target folder having the highest value of the normalized total degree of affinity. In cases where the values of such functions are identical across a number of target folders, in one embodiment, a user may be given an option to choose one of the target folders. In other embodiments, duplicate copies may be kept across several target folders.

The steps or the rules that are inferred during the process may be saved in a memory or as a template, such that the same set of rules may be applied to move any object. In an embodiment, the target folders are indexed based upon a precedence of objects present in them. In another embodiment, an index may be created for storing the inferred rules along with parameters of the rules. The index may store the computations of different values during the process and may update the values based upon a classification of one or more objects to corresponding target folders. Each time an object is moved to a target folder based upon the inferred rules, the index updates any change that has occurred with respect to the classification of the object. The rules are correspondingly updated and the updated set of rules is applied during the next classification.

Figure 2:
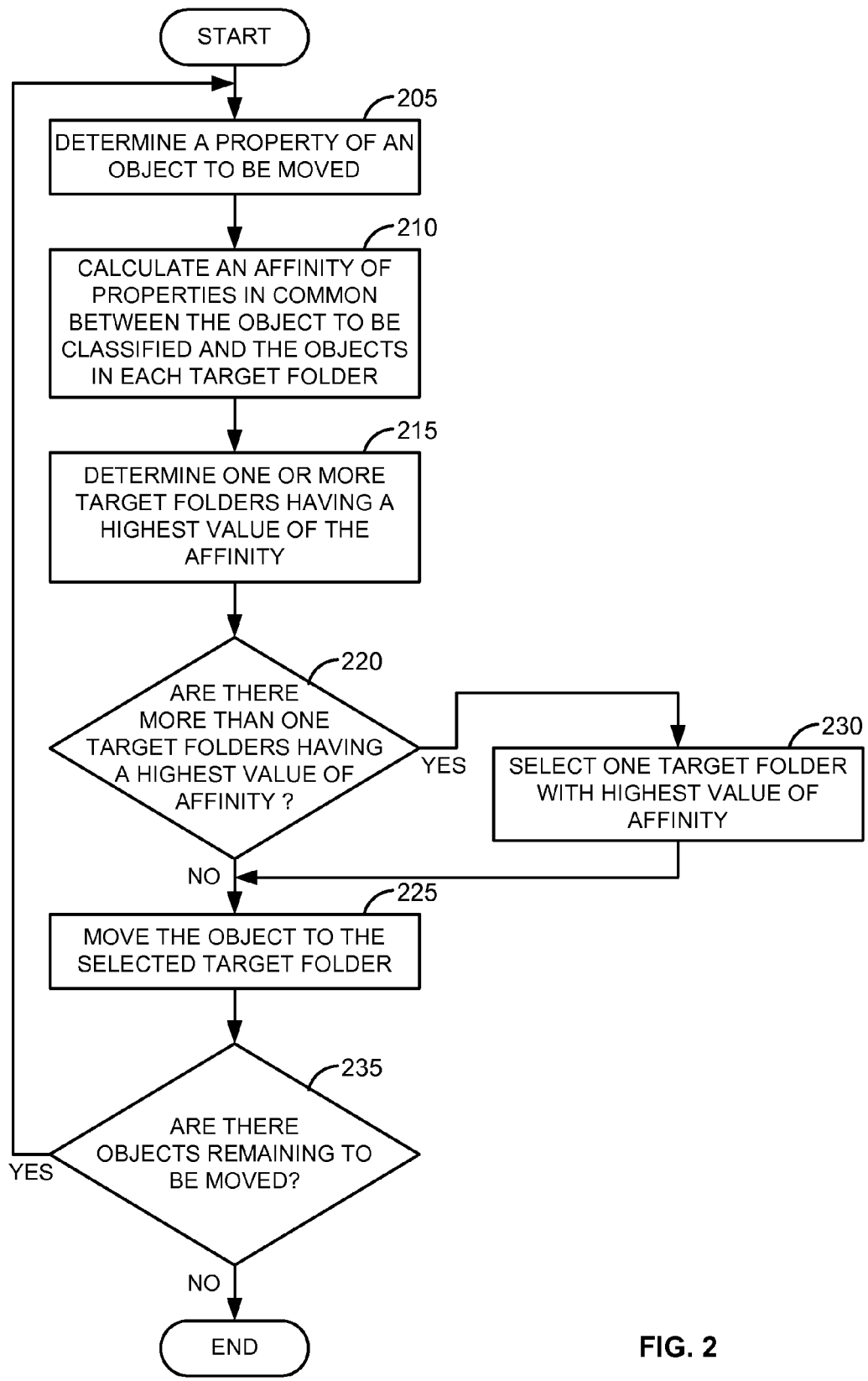
FIG. 2 is a flow diagram of an exemplary process for inferring rules to move an object from a source target folder to one of one or more target folders according to another embodiment of the invention.

FIG. 2 is a flow diagram of an exemplary process for inferring rules to move an object from a source target folder to one of one or more target folders according to another embodiment of the invention. In process block 205, a property of the object to be moved from a source folder to a target folder is determined. The object has to be moved to one of the target folders that has a likelihood of having the object. In process block 210, an affinity of properties in common between the object to be classified and the objects in each target folder is calculated. The affinity is a sum of a product of a first degree of affinity and a second degree of affinity. The first degree of affinity is indicative of an affinity of the object to each target folder and a uniqueness of the affinity across all target folders. The second degree of affinity is indicative of an affinity of the object within each target folder and a statistical significance of the affinity within the target folder.

In process block 215, the one or more target folders having a highest value of the affinity is determined. In decision block 220, if there are more than one target folders having a highest value of the affinity, the process proceeds to process block 230. In process block 230, one of the target folders having the highest value of the affinity is selected. The process proceeds to process block 225.

In decision block 220, if there is only one target folder having a highest value of the affinity, the process proceeds to process block 225. In an embodiment, the target folder having the highest value of the affinity is selected. In process block 225, the object is moved to the selected target folder. In process block 235, if there are objects remaining in the source folder to be moved to target folder, the process proceeds to process block 205. In process block 235, if there are no objects remaining in the source folder, to be moved to target folder, the process ends. The steps or the rules that are inferred during the process may be saved in a memory or as a template, such that the same set of rules may be applied to move any object. In an embodiment, an index may be created for storing the inferred rules along with parameters of the rules. Each time an object is moved to a target folder based upon the inferred rules, the index updates any change that has occurred with respect to the classification of the object. The rules are correspondingly updated and the updated set of rules is applied during the next classification.

Figure 3:
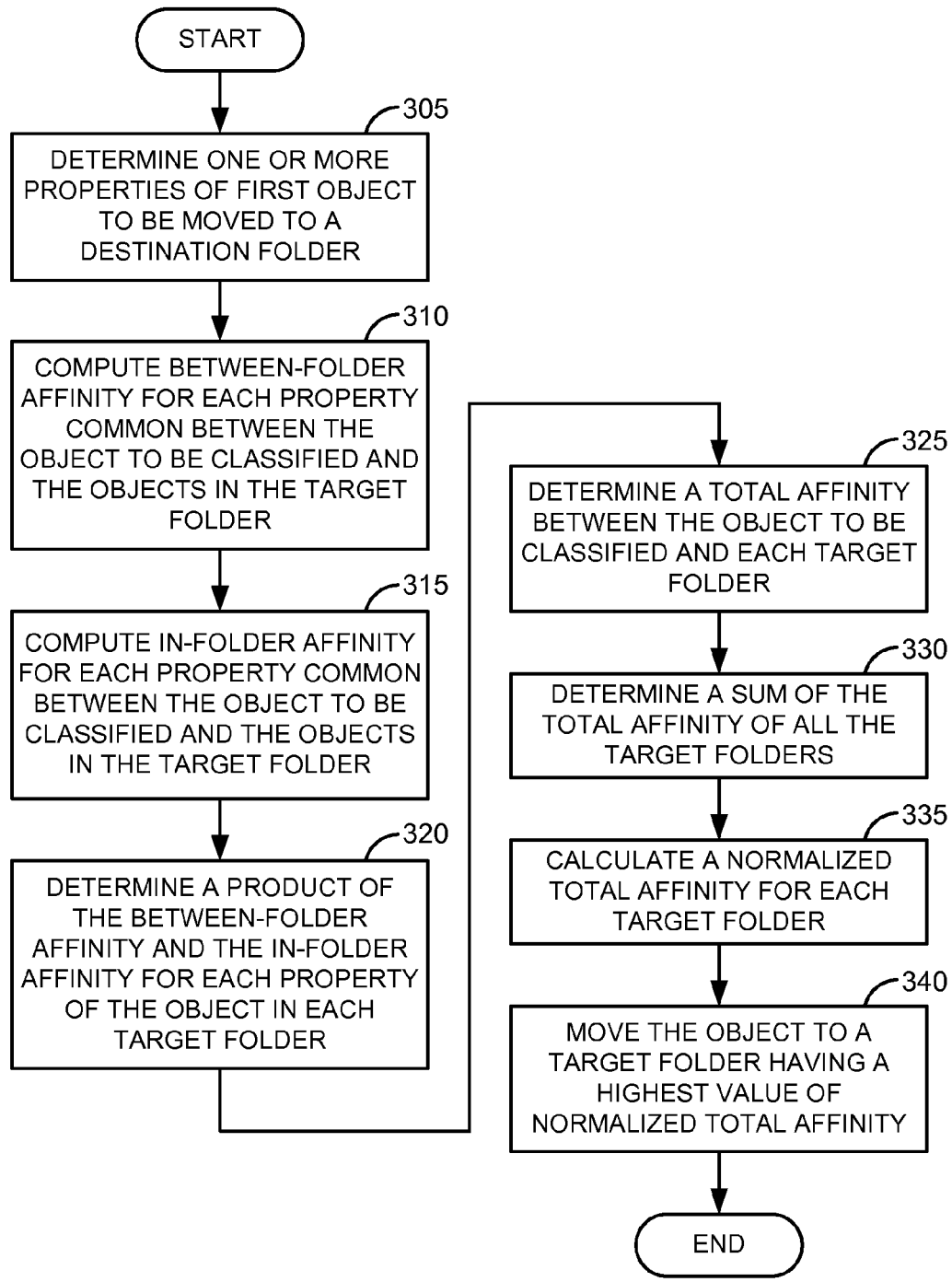
FIG. 3 is a flow diagram of an exemplary method for inferring rules to classify an object to one of one or more target folders according to an embodiment of the invention.

FIG. 3 is a flow diagram of an exemplary method for inferring rules to classify an object to one of one or more target folders according to an embodiment of the invention. In process block 305, properties of the object to be classified to a target folder are determined. The object has to be moved to one of the target folders that has a likelihood of having the object. In process block 310, a between-folder affinity for each property common between the object to be classified and the objects in the potential target folder is computed. For computing a between-folder affinity, a property of the object to be classified is selected. A number of objects in each target folder, having a property identical or nearly identical to the selected property of the object to be classified is determined. A total number of such objects across all target folders, having a property identical or nearly identical to the selected property of the object is determined. A ratio between the two numbers describes the between-folder affinity. Thus, the ratio between per target folder occurrence of each selected property of the object to be classified and the total number of occurrences of such property across all the target folders renders the between-folder affinity of the object to that target folder. The between-folder affinity is thus an exemplary composite indicator of not only the affinity of object's properties to a particular target folder but also the uniqueness of that affinity across all target folders. The between-folder affinity is calculated for each property of each of the target folders.

In process block 315, an in-folder affinity for each property common between the object to be classified and the objects in the potential target folder is computed. For computing an in-folder affinity, a property of the object to be classified is selected. A number of objects in each target folder, having a property identical or nearly identical to the selected property of the object to be classified is determined. A total number of objects in the corresponding target folder is determined. A ratio between the two numbers describes the in-folder affinity. Thus, the ratio between the per target folder occurrence of each selected property of the object to be classified and the total number of all objects in the corresponding target folder renders the in-folder affinity of the object to that target folder. The in-folder affinity is thus an exemplary composite indicator of the statistical significance of the affinity of an object's properties to a particular target folder in light of all objects in a target folder. The in-folder affinity is calculated for each property of each of the target folders.

In process block 320, a product of the between-folder affinity and the in-folder affinity is determined for each property of the object in each target folder. In process block 325, a total affinity between the object to be classified and each target folder is determined. To determine that total affinity, a sum of the product of the between-folder affinity and in-folder affinity for each target folder is determined for each property of the objects in each target folder. Thus the sum of the product of the between-folder affinity and the in-folder affinity for all the properties of the objects in each target folder renders the total affinity for each target folder.

In process block 330, a sum of the total affinity of all the target folders is determined. The sum of the total affinity is determined by adding the total affinity of each target folder. In process block 335 a normalized total affinity is calculated for each target folder. The normalized total affinity is a ratio of the total affinity of each target folder and the sum of the total affinity of all the target folders. The target folder with the highest value of the normalized total affinity between each target folder is determined, and in process block 340, the object is moved to the target folder having the highest value of the normalized total affinity.

The steps or the rules that are inferred during the process may be saved in a memory or as a template, such that the same set of rules may be applied to move any object. In an embodiment, an index may be created for storing the inferred rules along with parameters of the rules. The index may store the computations of different values during the process and may update the values based upon a classification of one or more objects to corresponding target folders. The index may include values for one or more properties of the object to be classified to one of the target folders, one or more objects present in each target folder and corresponding one or more properties describing the object, a between-folder affinity of each property of the objects present in each target folder, an in-folder affinity of each property of the objects present in each target folder, a total affinity for each property of the objects present in each target folder, a normalized total affinity for each target folder, and a highest value of normalized total affinity. Each time an object is moved to a target folder based upon the inferred rules, the index updates any change that has occurred with respect to the classification of the object. The rules are correspondingly updated and the updated set of rules is applied during the next classification.

Figure 4:
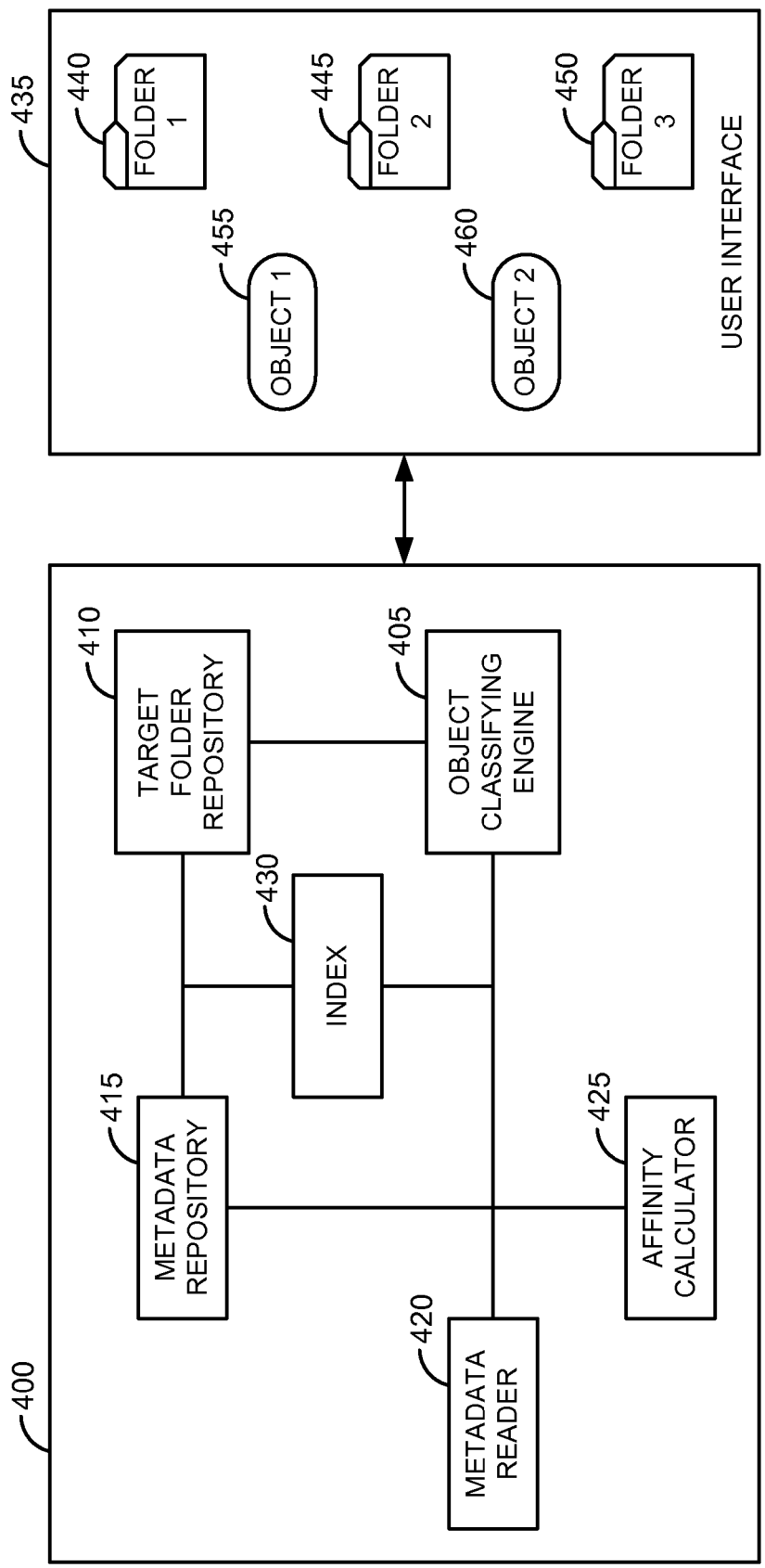
FIG. 4 is a block diagram of an exemplary system for inferring rules to classify an object to one of one or more target folders according to an embodiment of the invention.

FIG. 4 is a block diagram of an exemplary system for inferring rules to classify an object to one of one or more target folders according to an embodiment of the invention. System 400 includes object classifying engine 405, target folder repository 410, metadata repository 415, metadata reader 420, and affinity calculator 425. According to an embodiment, target folder repository 410 is in communication with metadata repository 415 and object classifying engine 405. Metadata repository 415 is in communication with metadata reader 420 and calculator 425. Affinity calculator 425 is in communication with object classifying engine 405.

System 400 is utilized to infer rules to move a object to one of one or more target folders. Each target folder may include one or more objects and corresponding one or more properties describing the object. One or more properties of the object are determined. A between-folder affinity of each property of the objects present in each target folder is calculated. An in-folder affinity for each property of the objects present in each target folder is calculated. A product of the between-folder affinity and the in-folder affinity is determined for each property of the object in each target folder. A total affinity between the object to be classified and each target folder is determined. To determine the total affinity, a sum of the product of the between-folder affinity and in-folder affinity for each target folder is determined for each property of the objects in each target folder. Thus the sum of the product of the between-folder affinity and the in-folder affinity for all the properties of the objects in each target folder renders the total affinity for each target folder. A sum of the total affinity of all the target folders is determined. The sum of the total affinity is determined by adding the total affinity of each target folder. A normalized total affinity is calculated for each target folder. The normalized total affinity is a ratio of the total affinity of each target folder and the sum of the total affinity of all the target folders. The target folder with the highest value of the normalized total affinity between each target folder is determined, and the object is moved to the target folder having the highest value of the normalized total affinity. If there are more than one target folders having the highest value of normalized total affinity, an option is provided to make a selection of one target folder having the highest value of the normalized affinity.

Target folder repository 410 stores the target folders along with the corresponding objects and properties describing each object. Metadata repository 415 stores information about each target folder and corresponding objects and properties describing each object. The information stored may include—the number of objects present in each target folder, the properties of each object, the total degree of affinity for each property of the objects present in each target folder, the normalized total degree of affinity for each target folder, and the information about the target folder to which the object is moved.

Metadata reader 420 reads all the information present in metadata repository 415. Metadata reader 420 determines the number of objects present in each target folder, the properties of each object, the total degree of affinity for each property of the objects present in each target folder, the normalized degree if affinity for each target folder, and the target folder to which the object has to be moved.

Affinity calculator 425 calculates the between—folder affinity of each property of the objects present in each target folder, and the in-folder affinity of each property of the objects present in each target folder. In an embodiment, the values of the between-folder affinity and in-folder affinity may be stored in metadata repository 415. Based upon the calculations and the values stored in metadata repository 415, object classification engine 405 classifies the object to the target folder having the highest value of normalized degree of affinity.

In an embodiment, index 430 stores the one or more properties of the object to be classified to one of the target folders, one or more objects present in each target folder and corresponding one or more properties describing the object, the between-folder affinity of each property of the objects present in each target folder, the in-folder affinity of each property of the objects present in each target folder, the total degree of affinity for each property of the objects present in each target folder, the normalized total degree of affinity for each target folder, and the highest value of normalized total degree of affinity. Index 430 may store the calculations of different values during the process and may update the values based upon a classification of one or more objects to corresponding target folders. Each time an object is moved to a target folder based upon the inferred rules, index 430 updates any change that has occurred with respect to the classification of the object. The rules are correspondingly updated and the updated set of rules is applied during the next classification.

User interface 435 depicts the target folders (e.g. 440, 445, 450) and objects (e.g. 455, 460) that have to be moved to one of the target folders. Once the highest value of the normalized total degree of affinity for each object (e.g. 455, 460) is determined for each of the target folders (e.g. 440, 445, 450), the object (e.g. 455, 460) is moved to the corresponding target folder having the highest value of the normalized total degree of affinity for that object. In an embodiment, user interface 435 may depict the target folders and the objects that have to be moved to one of the target folders as a list.

FIG. 5 is an example screen display for inferring rules to classify an object to one of one or more target folders according to an embodiment of the invention. The screen display includes source folder 505 and object 510 to be classified that is residing in source folder 505, four target folders (e.g. 515, 520, 525, and 530) along with corresponding objects and properties describing the objects. For example, target folder 515 includes two objects with first property describing the company name 'AKRON HEATING', having a second property describing the address as '1 AKRON AVENUE' and '110 MILLER ROAD'; third property describing the city as 'AKRON' for both the objects; fourth property describing the contact person as 'SUZY STEEL' for both the objects and fifth property describing the product as 'VALVES' for both the objects. Similarly, source folder 505 may include object 510 with first property describing the company 'AKRON HEATING', second property describing the address as '1 AKRON AVENUE', third property describing the city 'AKRON', fourth property describing the contact 'JOHN PETERS' and fifth property describing the product 'PIPING'.

A between-folder affinity for each property common between the object to be classified and the objects in the potential target folder is computed. For computing a between-folder affinity, a property of the object to be classified is selected. A number of objects in each target folder, having a property identical or nearly identical or nearly identical to the selected property of the object to be classified is determined. A total number of such objects across all target folders, having a property identical or nearly identical to the selected property of the object is determined. A ratio between the two numbers describes the between-folder affinity. An in-folder affinity for each property common between the object to be classified and the objects in the potential target folder is computed. For computing an in-folder affinity, a property of the object to be classified is selected. A number of objects in each target folder, having a property identical or nearly identical to the selected property of the object to be classified is determined. A total number of objects in the corresponding target folder is determined. A ratio between the two numbers describes the in-folder affinity. A product of the between-folder affinity and the in-folder affinity is determined for each property of the object in each target folder. A total affinity between the object to be classified and each target folder is determined. To determine the total affinity, a sum of the product of the between-folder affinity and in-folder affinity for each target folder is determined for each property of the objects in each target folder. Thus the sum of the product of the between-folder affinity and the in-folder affinity for all the properties of the objects in each target folder renders the total affinity for each target folder. A sum of the total affinity of all the target folders is determined. The sum of the total affinity is determined by adding the total affinity of each target folder. A normalized total affinity is calculated for each target folder. The normalized total affinity is a ratio of the total affinity of each target folder and the sum of the total affinity of all the target folders. The target folder with the highest value of the normalized total affinity between each target folder is determined, and, the object is moved to the target folder having the highest value of the normalized total affinity.

The between-folder affinity for each property may be expressed as:

$$Pbf = Nfb/N$$

where 'Pb' represents the between-folder affinity, 'f' represents the target folder, Nfb represents the number of objects in each target folder 'f', having a property identical or nearly identical or nearly identical to the property of the object to be classified; and N represents the total number of objects across all target folders, having a property identical to or nearly identical to the object to be classified. For example, N1$b$ for first property of the objects in target folder 'FOLDER 1' 515 with respect to the object 510 to be classified is '2', as target folder 'FOLDER 1' 515 has the first property of the two objects identical to the first property of object 510. Similarly, N for first property of object 510 is '4', as the total number of objects having a property identical to the first property of object 510 is four, occurring in target folders 'FOLDER 1' 515 and 'FOLDER 2' 520. Now, Pb1 for target folder 'FOLDER 1' 515 is 2/4=0.5

The in-folder affinity for each property may be expressed as:

$$Pif = Nfi/Ni$$

where 'Pi' represents the in-folder affinity, 'f' represents the target folder, 'Nfi' represents the number of objects in each target folder 'f', having a property identical or nearly identical or nearly identical to the property of the object to be classified; and 'Ni' represents the total number of objects present in the corresponding target folder 'f'. For example, N1$i$ for first property of the objects in target folder 'FOLDER 1' 515 with respect to object 510 is '2', as target folder 'FOLDER 1' 515 has the first property of the two objects identical to the first property of object 510. Similarly, Ni for first property of object 510 is '2', as the total number of objects in target folder 'FOLDER 1' 515, having a property identical to the first property of object 510 is two. Now, Pi1 for target folder 'FOLDER 1' 515 is 2/2=1.

The product of the between-folder affinity and in-folder affinity for each target folder may be expressed as:

$$PVf = Pbf \times Pif$$

where 'PV' represents the product of the between-folder affinity and the in-folder affinity, for each target folder 'f'; 'Pb' represents the between-folder affinity for the corresponding target folder 'f'; and 'Pi' represents the in-folder affinity for the corresponding target folder 'f'. For example, PV1 for target folder 'FOLDER 1' 515 is 0.5×1=0.5

The sum of the product of the between-folder affinity and the in-folder affinity for all the properties of the objects in each target folder may be expressed as:

$$TPVf = \Sigma\ PVf$$

where 'TPV' represents the sum of the product of the between-folder affinity and the in-folder affinity for each target folder 'f'; and 'Σ PVf' represents the summation of the product of the between-folder affinity and the in-folder affinity PV for each target folder 'f'

The total affinity of all target folders may be expressed as:

$$TP = \Sigma\ TPVf$$

where 'TP' represents the total affinity of all target folders, and 'Σ TPV' represents the summation of the sum of the product of the between-folder affinity and in-folder affinity for all the properties of the objects in all the target folders The normalized total affinity for each target folder may be expressed as:

$$NPf = TPVf/TP$$

where NP represents the normalized total affinity for each target folder 'f'; 'TPVf' represents the sum of the product of the between-folder affinity and in-folder affinity for all the properties of the objects for each target folder 'f' and 'TP' represents the total affinity of all the target folders.

The calculations of the above values with respect to FIG. 5 are depicted in the following table.

TABLE 2

| Folder 'f' | Calculations | Properties | | | | |
|---|---|---|---|---|---|---|
| | | First | Second | Third | Fourth | Fifth |
| 1 | Pb1 = N1b/N | 2/4 = 0.5 | 1/1 = 1 | 2/2 = 1 | 0 | 0 |
| | Pi1 = N1i/Ni | 2/2 = 1 | 1/2 = 0.5 | 2/2 = 1 | 0 | 0 |
| | PV1 = Pb1 × Pi1 | 0.5 × 1 = 0.5 | 1 × 0.5 = 0.5 | 1 × 1 = 1 | 0 | 0 |
| | TPV1 = Σ PV1 | 0.5 + 0.5 + 1 + 0 + 0 = 2 | | | | |
| 2 | Pb2 = N2b/N | 2/4 = 0.5 | 0 | 0 | 0 | 0 |
| | Pi2 = N2i/Ni | 2/2 = 1 | 0 | 0 | 0 | 0 |
| | PV2 = Pb2 × Pi2 | 0.5 × 1 = 0.5 | 0 | 0 | 0 | 0 |
| | TPV2 = Σ PV2 | 0.5 + 0 + 0 + 0 = 0.5 | | | | |
| 3 | Pb3 = N3b/N | 0 | 0 | 0 | 0 | 0 |
| | Pi3 = N3i/Ni | 0 | 0 | 0 | 0 | 0 |
| | PV3 = Pb3 × Pi3 | 0 | 0 | 0 | 0 | 0 |
| | TPV3 = Σ PV3 | 0 | | | | |
| 4 | Pb4 = N4b/N | 0 | 0 | 0 | 0 | 0 |
| | Pi4 = N4i/Ni | 0 | 0 | 0 | 0 | 0 |
| | PV4 = Pb4 × Pi4 | 0 | 0 | 0 | 0 | 0 |
| | TPV4 = Σ PV4 | 0 | | | | |

TP = Σ TPVf = TPV1 + TPV2 + TPV3 + TPV4 = 2 + 0.5 + 0 + 0
TP = 2.5

TABLE 3

| Folder 'f' | NPf |
|---|---|
| 1 | 2/2.5 = 0.8 or 80% |
| 2 | 0.5/2.5 = 0.2 or 20% |
| 3 | 0 |
| 4 | 0 |

From the above tables, Table 2 and Table 3, target folder 'FOLDER 1' 515 has the highest value of normalized total affinity. Hence, object 510 has to be moved to target folder 'FOLDER 1' 515.

In an embodiment, a matrix may be deduced from the above table. The matrix may be used to easily determine the total affinity for each target folder. Based on the entries in the matrix, rules may be inferred to move objects in source folder 505. An index may store the entries in the matrix and may update the values based upon a classification of one or more objects in source folder 505 to corresponding target folders. Each time an object is moved to a target folder based upon the inferred rules, the index updates any change that has occurred with respect to the classification of the object. The rules are correspondingly updated and the updated set of rules is applied during the next classification. The matrix deduced for the above table may be illustrated as follows:

| | p1 | p2 | p3 | p4 | p5 |
|---|---|---|---|---|---|
| f1 | 0.5 | 0.5 | 1 | 0 | 0 |
| f2 | 0.5 | 0 | 0 | 0 | 0 |
| f3 | 0 | 0 | 0 | 0 | 0 |
| f4 | 0 | 0 | 0 | 0 | 0 | where f1, f2, f3 and f4 represents the target folders and p1, p2, p3, p4 and p5 represents the properties of all the objects in each target folder. The values in the matrix represent the total affinity of each property for each target folder.

Embodiments of the invention may include various steps as set forth above. The steps may be embodied in machine-executable program code which causes a general-purpose or special-purpose processor to perform certain steps. Alternatively, these steps may be performed by specific hardware components that contain hardwired logic for performing the steps, or by any combination of programmed computer components and custom hardware components.

Embodiments of the present invention may also be provided as a tangible machine-readable medium for storing the machine-executable instructions. The tangible machine-readable medium may include, but is not limited to, flash memory, optical disks, CD-ROMs, DVD ROMs, RAMs, EPROMs, EEPROMs, magnetic or optical cards, or any other type of machine-readable media suitable for tangibly storing electronic instructions. The machine readable medium can provide the instructions stored therein to a computer system comprising a processor capable of reading and executing the instructions to implement the method steps described herein.

It should be appreciated that reference throughout this specification to one embodiment or an embodiment means that a particular feature, structure or characteristic described in connection with the embodiment is included in at least one embodiment of the present invention. These references are not necessarily all referring to the same embodiment. Furthermore, the particular features, structures or characteristics may be combined as suitable in one or more embodiments of the invention.

Throughout the foregoing description, for the purposes of explanation, numerous specific details were set forth in order to provide a thorough understanding of the invention. It will be apparent, however, to one skilled in the art that the invention may be practiced without some of these specific details. The detailed description as set forth above includes descriptions of method steps. However, one skilled in the art will understand that the order of the steps set forth above is meant for the purposes of illustration only and the claimed invention is not meant to be limited only to the specific order in which the steps are set forth. Accordingly, the scope and spirit of the invention should be judged in terms of the claims which follow.

The invention claimed is:

1. An article of manufacture, comprising a non-transitory machine readable medium having instructions which when executed by a machine cause the machine to perform operations comprising:

determining one or more properties of an object to be classified;

computing a first degree of affinity for each property common between the object to be classified and one or more objects of a target folder, the first degree of affinity indicative of an affinity of the object to each target folder and a uniqueness of the affinity across all target folders;

computing a second degree of affinity for each property common between the object to be classified and the one or more objects of the target folder, the second degree of affinity indicative of an affinity of the object within each target folder and a statistical significance of the affinity within the target folder;

calculating a total degree of affinity between the object to be classified and each target folder, the total degree of affinity being a sum of a product of the first degree of affinity and the second degree of affinity for all properties of the object;

calculating a normalized total degree of affinity, the normalized total degree of affinity calculated by averaging the total degree of affinity across all target folders;

identifying at least one of the target folders as having a highest value of the normalized total degree of affinity; and moving the object to be classified to the identified target folder.

2. The article of manufacture of claim 1, wherein computing the first degree of affinity comprises:

for each target folder, determining properties common between the object to be classified and objects of the target folder;

for each common property, determining a per folder number of objects of the target folder having property identical to the object to be classified;

determining a total number of objects across all target folders having a property identical to the object to be classified; and calculating a ratio between the per folder number of objects and the total number of objects.

3. The article of manufacture of claim 1, wherein computing a second degree of affinity comprises:

selecting a property of the object to be classified;

for each target folder, determining a number of objects having a property identical the object to be classified;

determining a total number of objects in corresponding target folders; and calculating a ratio between the number of objects with identical properties and the total number of objects.

4. A computer implemented method to infer rules to classify an object to one of one or more target folders, the method comprising:

determining one or more properties of the object to be classified to one of the one or more target folders, each target folder having one or more objects and corresponding one or more properties of the object;

computing a between-folder affinity for each property common between the object to be classified and the one or more objects of the target folder, by determining a number of objects having a property identical to the object to be classified, within each target folder, determining a total number of objects having a property identical to the object to be classified, across all target folders, and calculating a ratio between the number of objects with identical properties and the total number of objects;

computing an in-folder affinity for each property common between the object to be classified and the objects of the target folder, by determining a number of objects having a property identical to the object to be classified, within each target folder, determining a total number of objects in corresponding target folder, and calculating a ratio between the number of objects with identical properties and the total number of objects;

calculating a total degree of affinity between the object to be classified and each target folder, by determining a product of the between-folder affinity and the in-folder affinity for each property of the objects in each target folder, and determining a sum of the product of between-folder affinity and the in-folder affinity for each target folder;

calculating a normalized total degree of affinity for each target folder, by determining a sum of the total degree of affinity of all the target folders, and determining a ratio of the total degree of affinity for each target folder and the sum of the total degree of affinity of all target folders; and moving the object to a target folder having a highest value of the normalized total degree of affinity.

5. The computer implemented method of claim 4, wherein the object to be classified, may be residing in a source folder.

6. The computer implemented method of claim 4, wherein the object is classified as belonging to one of the target folders based on a function of a first degree of affinity and a second degree of affinity.

7. The computer implemented method of claim 4, wherein, if there are more than one target folders having the highest value of the normalized total degree of affinity, providing an option to choose the target folder to move the object.

8. The computer implemented method of claim 4, wherein based on the inferred rules one or more objects may be categorized to a respective target folder.

9. The computer implemented method of claim 4, wherein the inferred rules may be stored as a template.

10. The computer implemented method of claim 4, wherein a view of one of the one or more target folders may be generated based upon the inferred rules.

11. The computer implemented method of claim 4, wherein a user action performed on one of the one or more target folders may generate a tooltip to view information about the one or more objects already present in corresponding target folder.

12. The computer implemented method of claim 4, wherein the target folders are indexed based upon a precedence of objects stored therein.

13. The computer implemented method of claim 4, further comprising moving the object to a target folder based upon inferred rules stored in an index.

14. The computer implemented method of claim 13, wherein the index is updated based upon one or more changes that occur when an object is moved to a target folder.

15. The computer implemented method of claim 14, wherein, based upon the changes that occur when an object is moved to a target folder, the inferred rules stored in the index are updated.

16. The computer implemented method of claim 15, wherein the index further comprises:

one or more properties of the object to be classified to one of the target folders;

one or more objects present in each target folder and corresponding one or more properties describing the object;

a between-folder affinity of each property of the objects present in each target folder, an in-folder affinity of each property of the objects present in each target folder, a total degree of affinity for each property of the objects present in each target folder, a normalized total affinity for each target folder, and a highest value of normalized affinity.

17. A computer system to infer rules to classify an object to one of one or more target folders, the system comprising:

a target folder repository to store, in memory, the target folders, the target folders having one or more objects and corresponding one or more properties describing the object;

a metadata repository in communication with the target folder repository, to store information about the target folders and contents of the target folders;

a metadata reader in communication with the metadata repository, to determine one or more properties of the object to be classified to one of the one or more target folders, an affinity calculator in communication with the metadata repository and the metadata reader, to compute, by a processor, a between-folder affinity of each property common between the object to be classified and the one or more objects of the target folder, wherein the metadata reader determines a number of objects having a property identical to the object to be classified within each target folder, and a total number of objects having a property identical to the object to be classified across all target folders, and calculates a ratio between the number of objects with identical properties and the total number of objects, and to compute, by the processor, an in-folder affinity of each common between the object to be classified and the objects of the target folder, wherein the metadata reader determines a number of objects having a property identical to the object to be classified within each target folder, and a total number of objects in corresponding target folder, and calculates a ratio between the number of objects with identical properties and the total number of objects;

the metadata reader to calculate, by the processor, a normalized total degree of affinity for each target folder by determining a sum of the total degree of affinity of all the target folders, and determining a ratio of the total degree of affinity for each target folder and the sum of the total degree of affinity of all target folders; and an object classifying engine in communication with the affinity calculator, the metadata reader and the target folder repository, to move the object to a target folder having a highest value of the normalized affinity.

18. The computer system of claim 17, further comprising an index in communication with the target folder repository, the metadata repository, the metadata reader, the affinity calculator and the object classifying engine, for storing the inferred rules along with parameters of the rules.

19. The computer system of claim 18, wherein the index is updated based upon a modification in contents of the index.

20. The computer system of claim 17, further comprises a memory for storing the inferred rules.

* * * * *